(12) United States Patent
Xie et al.

(10) Patent No.: US 9,214,290 B2
(45) Date of Patent: Dec. 15, 2015

(54) TOUCH PANEL AND MANUFACTURING METHOD THEREOF

(71) Applicant: TPK Touch Solutions (Xiamen) Inc., Xiamen (CN)

(72) Inventors: Yanjun Xie, Wuhan (CN); Yau-Chen Jiang, Zhubei (TW); Bin Lai, Fuzhou (CN); Enshi Shi, Xiamen (CN); Hua Ding, Xiamen (CN); Silu Yu, Fuzhou (CN)

(73) Assignee: TPK Touch Solutions (Xiamen) Inc., Xiamen (CN)

(*) Notice: Subject to any disclaimer, the term of this patent is extended or adjusted under 35 U.S.C. 154(b) by 261 days.

(21) Appl. No.: 13/894,447

(22) Filed: May 15, 2013

(65) Prior Publication Data

US 2013/0306452 A1    Nov. 21, 2013

(30) Foreign Application Priority Data

May 16, 2012    (CN) .......................... 2012 1 0150711

(51) Int. Cl.
*H03K 17/975* (2006.01)
*H01H 1/64* (2006.01)
*H01H 11/00* (2006.01)
*G06F 3/041* (2006.01)

(52) U.S. Cl.
CPC .............. *H01H 1/64* (2013.01); *G06F 3/041* (2013.01); *H01H 11/00* (2013.01); *G06F 2203/04103* (2013.01); *G06F 2203/04107* (2013.01); *Y10T 29/49105* (2015.01)

(58) Field of Classification Search
CPC ..... H01H 1/64; H03K 17/96; H03K 17/9618; H03K 17/962; H03K 17/9622
USPC ......................................................... 200/600
See application file for complete search history.

(56) References Cited

U.S. PATENT DOCUMENTS

2012/0268402 A1*  10/2012  Wang et al. .................... 345/173
2013/0161178 A1*   6/2013  Kim et al. ..................... 200/600

FOREIGN PATENT DOCUMENTS

| CN | 101546241 | 9/2009 |
| CN | 101546242 | 9/2009 |
| TW | 201013500 | 4/2010 |

\* cited by examiner

*Primary Examiner* — Renee Luebke
*Assistant Examiner* — Lheiren Mae A Caroc
(74) *Attorney, Agent, or Firm* — Gokalp Bayramoglu

(57) ABSTRACT

A touch panel having a shielding layer and a manufacturing method thereof is provided. A manufacturing method of the touch panel comprises the steps of forming a plurality of first conductive axes and a plurality of second conductive units on a substrate; covering the first conductive axes and the second conductive units with an insulating layer and exposing at least a partial set of second conductive units; and forming a plurality of bridging structures and a shielding layer on the insulating layer simultaneously, wherein the bridging structures electrically connect to the second conductive units. The proposed method allows the shielding layer to be formed during the formation of the bridging structures, thereby eliminating the step of forming the shielding layer separately through an independent process, which saves costs and time.

20 Claims, 6 Drawing Sheets

TOUCH PANEL AND MANUFACTURING METHOD THEREOF

This application claims the benefit of Chinese application No. 201210150711.8, filed on May 16, 2012.

BACKGROUND

1. Technical Field

The present disclosure relates to a touch panel and a manufacturing method thereof, and in particular relates to a touch panel having a shielding layer.

2. Description of the Related Art

Existing consumer electronic products such as personal digital assistants, mobile phones, notebooks and tablet computers widely use touch panels as interface totals for information communication. In addition, with growing demand for higher efficiency electronic products, they are be designed with an objective of being light, thin, short and smart, so there is no sufficient space now available containing traditional input devices such as keyboard and mouse along with the product.

In order to avoid electronic signal interference while a touch panel sends or receives signals, a shielding layer is added to the touch panel thereby enhancing the capability of counter-interference for the touch panel on the principle of shielding static-electricity. However, formation of an additional shielding layer requires an individual process step, which increases the manufacture cost and makes manufacturing process more complex.

SUMMARY OF THE PRESENT DISCLOSURE

The present disclosure provides a touch panel and a manufacturing method thereof, which includes manufacturing of a shielding layer simultaneously during the manufacturing process of the touch panel thereby eliminating an additional manufacturing step for the shielding layer.

The present disclosure further provides a manufacturing method of touch panels, which includes the following steps: forming a plurality of first conductive axes and a plurality of second conductive units on a substrate; covering the first conductive axes and the second conductive units with an insulating layer and exposing at least partial second conductive units; and forming a plurality of bridging structures and a shielding layer on the insulating layer, wherein the bridging structures electrically connect to the second conductive units.

The present disclosure also provides a manufacturing method of touch panels, which includes the following steps: forming a plurality of bridging structures and a shielding layer on a substrate simultaneously; covering the bridging structures and the shielding layer with an insulating layer and exposing at least partial bridging structures; providing a plurality of first conductive axes and a plurality of second conductive units, wherein at least partial second conductive units are electrically connected to the bridging structures.

The present disclosure also provides a touch panel comprising a plurality of first conductive axes and a plurality of second conductive units; an insulating layer covering the first conductive axes and the second conductive units and exposing at least partial second conductive units; a plurality of bridging structures and a shielding layer on the insulating layer, and the bridging structures being electrically connected to the partial second conductive units, wherein materials of the shielding layer and the bridging structures being same, Which are formed during a common manufacturing process.

An advantageous feature of the present disclosure is that the shielding layer can be formed simultaneously during the process of forming the bridging structures by using the same materials, thereby eliminating the original individual process step needed for forming the shielding layer, which can save costs and time.

BRIEF DESCRIPTION OF THE DRAWINGS

For those skilled in the art to understand the present disclosure, numerous embodiments and drawings described below are for illustration purpose only; and not to limit the scope of the present disclosure in any manner.

DETAILED DESCRIPTION OF THE EMBODIMENTS

In order to make a person ordinarily skilled in the art familiar with technical field of present disclosure, following text particularly lists several preferable embodiments of the present disclosure described with reference made to attached drawings. The present disclosure also illustrates in detail the constituent components of the present disclosure and the efficiency to be achieved.

Figure 1:
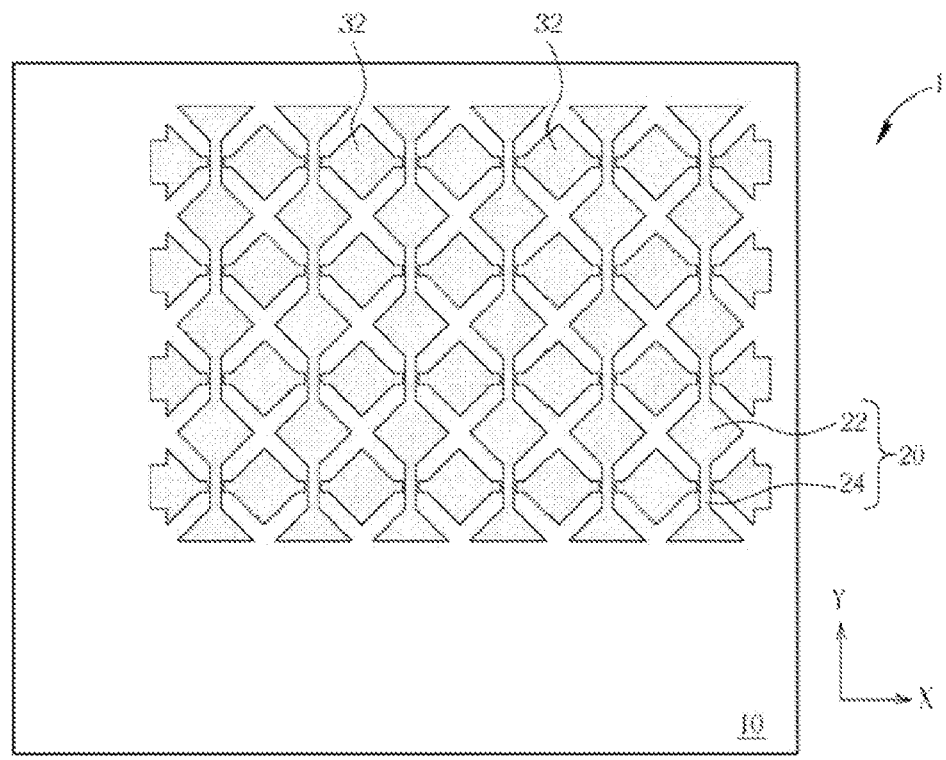
FIG. 1 is a top-viewed schematic diagram of a touch panel in a first embodiment of the present disclosure.

FIG. 1 is a top-viewed schematic diagram of a touch panel in a first embodiment of the present disclosure. The first embodiment of the present disclosure provides a manufacturing method of a touch panel 1, which includes the steps of forming a plurality of first conductive axes 20 and a plurality of second conductive units 32 on a substrate 10, wherein each of the first conductive axes 20 are formed by connecting a plurality of first conductive its 22 in series with a plurality of connection line sections 24 between two adjacent first conductive units 22. The first conductive axes 20 are arranged in parallel along a first direction (such as Y axis), and the second conductive units 32 are separated from the first conductive axes 20 mutually and are electrically insulated from each other. In addition, in the current exemplary embodiment, the first conductive units 22 and the second conductive units 32 are substantially presented in a diamond shape, which of course can be changed and shaped/configured based on specific requirements in any manner and is not limited to diamond shape.

Figure 2:
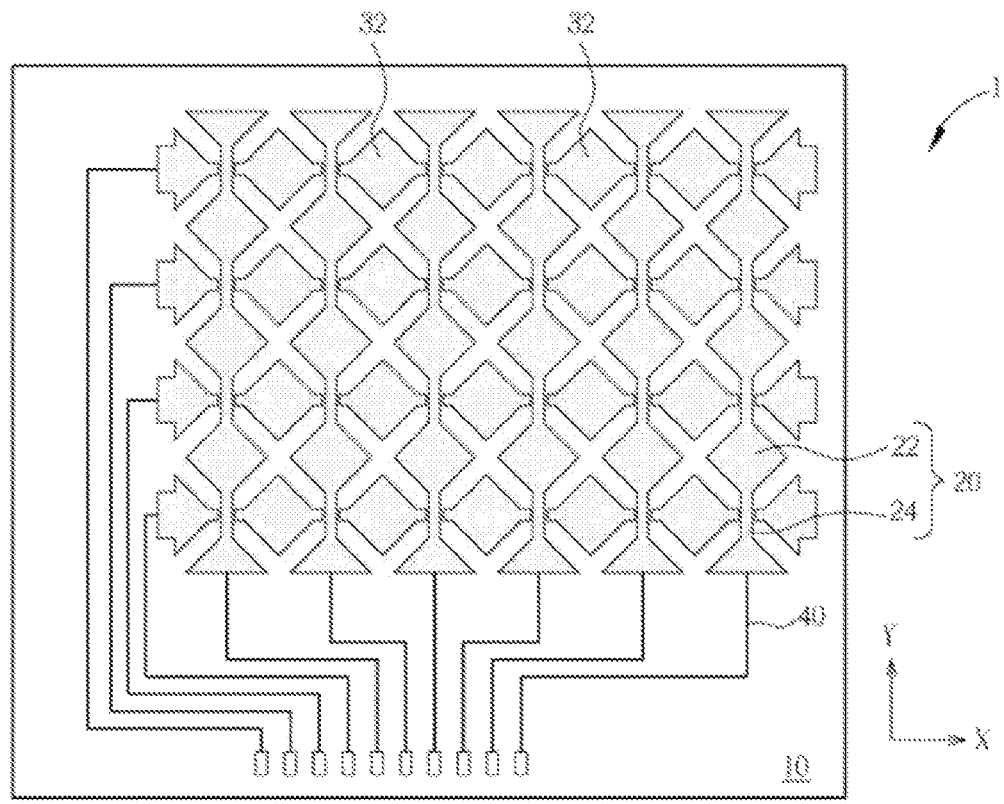
FIG. 2 is a top-viewed schematic diagram of the structure in the first embodiment of the present disclosure.

FIG. 2 is a top-viewed schematic diagram of the touch panel in the first embodiment. The embodiment of the present disclosure includes forming a plurality of conductive lines 40 that are electrically connected to a partial set of first conductive axes 20 and to a partial set of second conductive units 32. Material of the conductive lines 40 can be selected from metals such as aluminum, copper and silver, or other transparent conductive materials. Various conductive lines 40 are connected to an external touch chip (not shown) for transmitting signals sent by the touch panel to the touch chip.

Figure 3A:
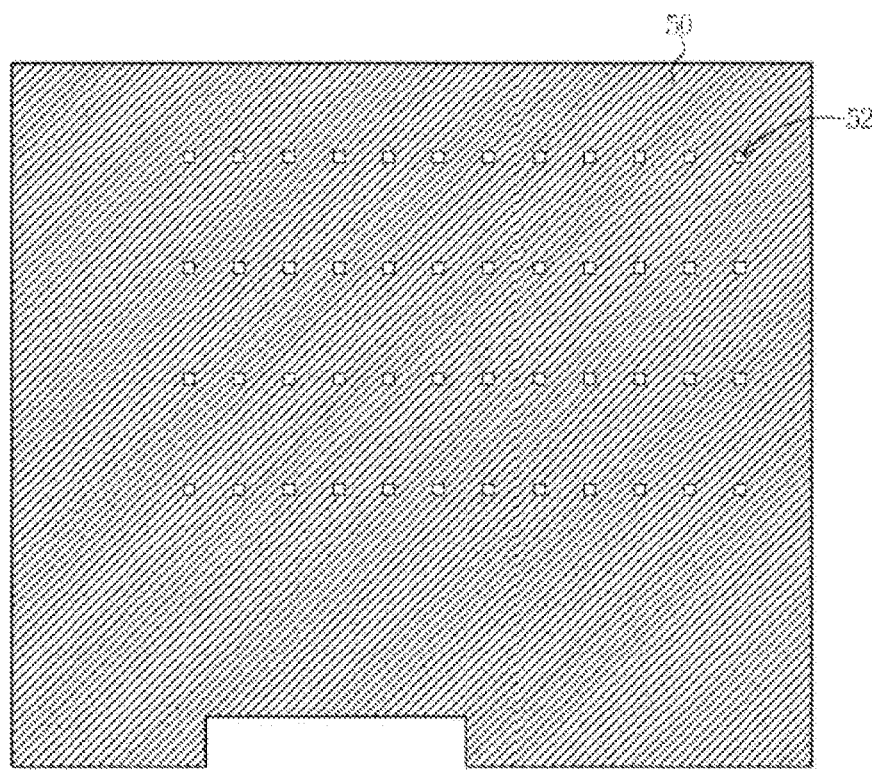
FIG. 3A is a top-viewed, schematic diagram of an insulating layer in the first embodiment of the present disclosure.
Figure 3B:
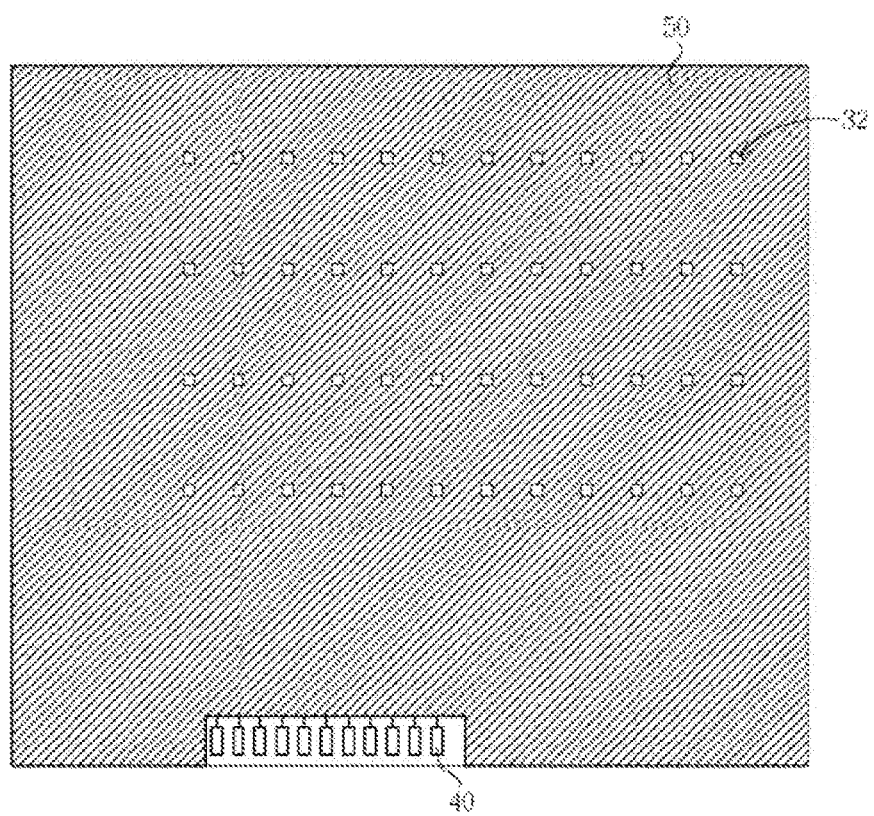
FIG. 3B is a top-viewed schematic diagram of the insulating layer in the first embodiment of the present disclosure.

In FIG. 3, according to an embodiment of the present invention, substrate 10, first conductive axis 20, and second conductive unit 32 are covered with an insulating layer 50. Observed from a top-viewed diagram of the insulating layer patterns as shown in FIG. 3A, a plurality of opening holes 52 are located on the insulating layer 50. The insulating layer 50 is layered onto the substrate as shown in FIG. 3B, and the opening holes 52 expose the partial second conductive units 32 and act as the contact holes for bridging structures in the subsequent manufacturing process. In the embodiment, the insulating layer 50 is made of various non-conductive materials such as Polyimide, $SiO_2$, SiN, SiCN and SiC.

Figure 4A:
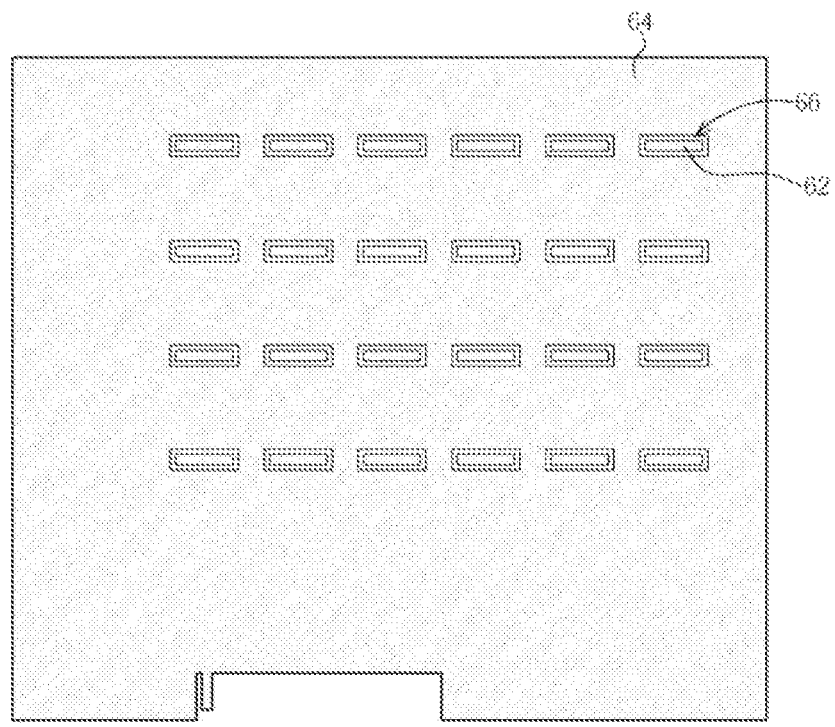
FIG. 4A is a top-viewed schematic diagram of bridging structures and shielding layer in the first embodiment of the present disclosure.
Figure 4B:
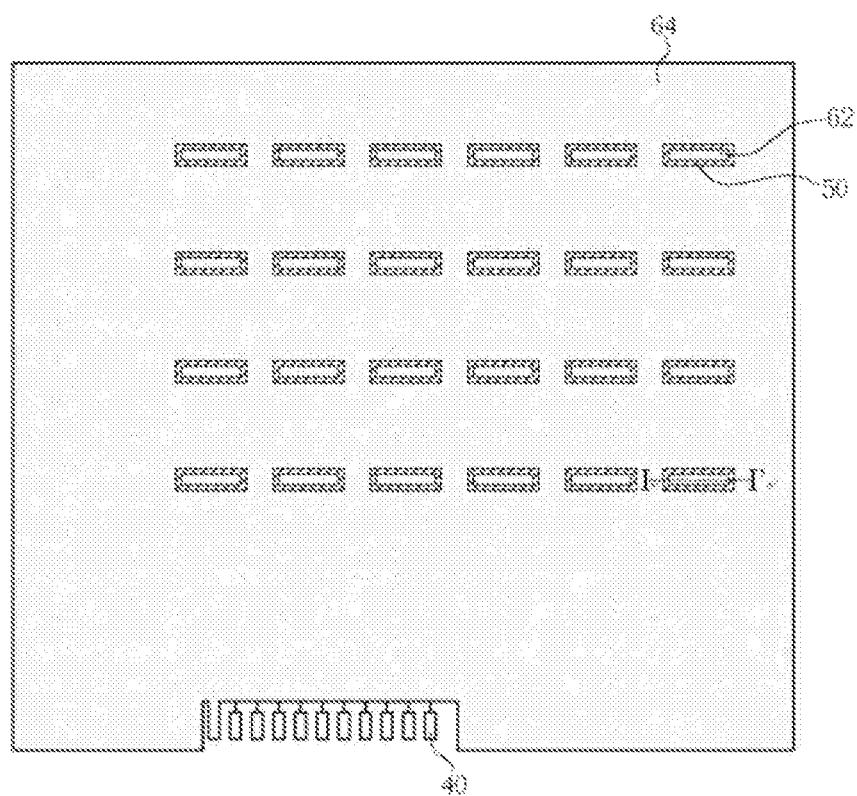
FIG. 4B is a top-viewed schematic diagram of the bridging structures and the shielding layer in the first embodiment of the present disclosure.
Figure 5A:
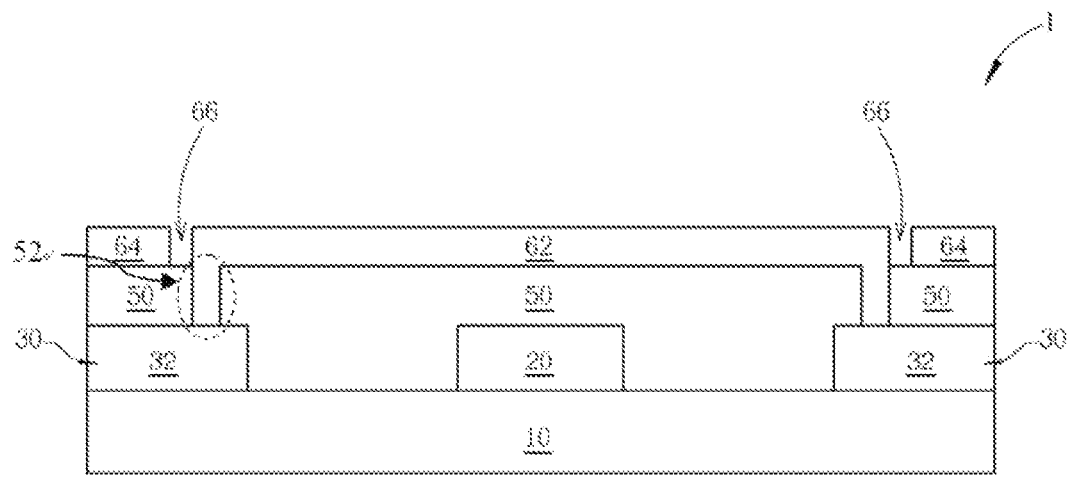
FIG. 5A is a cross-sectional schematic diagram of the touch panel cut along cross-sectional line II' of FIG. 4B in the first embodiment of the present disclosure.

In accordance with one aspect of the present invention a plurality of bridging structures and a shielding layer are formed simultaneously on an insulating layer 50. With reference to FIG. 4A~4B, FIG. 4A is a top-viewed diagram of bridging structures 62 and a shielding layer 64. As shown in FIG. 4B, the bridging structures 62 and the shielding layer 64 cover the insulating layer 50. Each bridging structure 62 represents a bridging shape viewed from a lateral side, crossing the insulating layer 50 and connecting two adjacent second conductive units 32, which makes the second conductive units 32 connected in series to form a plurality of second conductive axes 30. The shielding layer 64 and the bridging structures 62 are formed simultaneously. The shielding layer 64 surrounds the bridging structures 62, which are separated by a gap 66 in-between in order to actualize electrical separation and avoid interference caused by mutual contact. FIG. 5A is a cross-sectional diagram of the touch panel cut along the cross-sectional line II' of FIG. 4B in the first embodiment of the present disclosure. Since the shielding layer 64 and the bridging structures 62 are manufactured simultaneously in the present disclosure, the both material and thickness of the shielding layer 64 and the bridging structures 62 are the same. Compared with a well-known technology, the proposed process for forming shielding layer does not require a separate process, which results in significant cost-saving and time-saving.

Figure 5B:
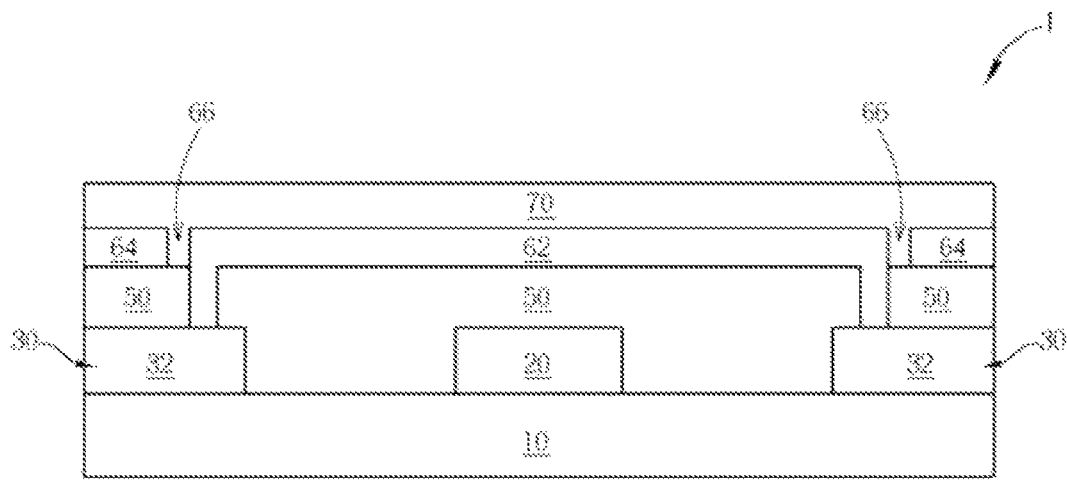
FIG. 5B is a cross-sectional schematic diagram of the touch panel in the first embodiment of the present disclosure.

In another embodiment, a protective layer 70 covers shielding layer 64 and bridging structure 62, as shown in FIG. 5B, to protect the components from being subject to damages of water vapor and oxygen. The protective layer 70 includes inorganic materials such as silicon nitride, silicon oxide and silicon oxynitride, and organic materials such as acrylic resin and other suitable materials. Material of the protective layer 70 fills the gap 66 for better protection of the touch panel 1. In another embodiment, the touch panel 1 made by the disclosed manufacturing method can include a liquid crystal display layer and other optical assemblies (not shown in FIG) onto the protective layer 70. The present disclosure can be applied to various touch panels such as a traditional touch panel using two pieces of substrates, in which conductive axes and conductive units are formed over a first substrate, and a second substrate (cover glass) covers the fit substrate and provides a touch plane. In a further embodiment, a single piece of substrate can also be used, of which one side provides a touch plane and on other side, conductive axes and conductive units are formed to constitute a structure of 'Touch On Lens' so as to save cost and reduce weight.

It should be noted that first conductive axes 20 are arranged in parallel along a first direction (such as Y axis), and a second conductive axes 30 formed by connecting bridging structures 62 and various second conductive units 32 in series are arranged in parallel along a second direction such as X axis. The first direction being mutually vertical to the second direction and/or can be modified suitable based on practical requirements and designs. In another embodiment, one end of shielding layer 64 can be connected to the ground to shield interference from other electronic elements by static-electricity and further to promote stability of the touch panel.

Compared with the prior art, proposed method of the touch panel allows manufacturing of shielding layer and bridging structures to be done at the same time, which simplifies the manufacturing process and resists interference from outside electronic signals and promotes stability of the touch panel.

Following embodiments relate to touch panels. In order to simplify the illustration, following content elaborates differences of various embodiments and does not describe already discussed elements/features again. Identical elements in various embodiments of the present disclosure are marked with identical labels to benefit mutual contrast between various embodiments.

Figure 6:
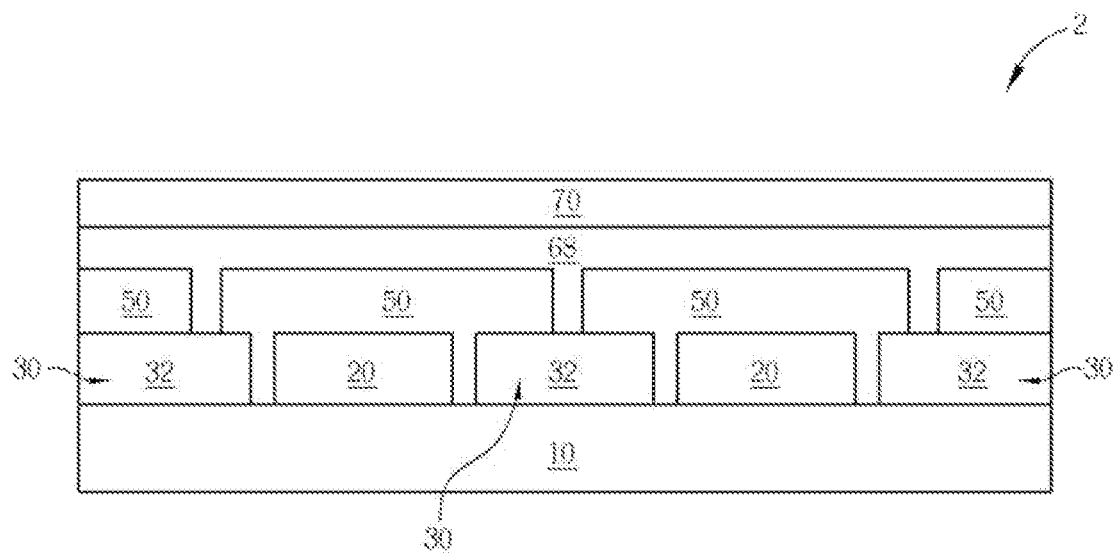
FIG. 6 is a cross-sectional schematic diagram of the touch panel in a second embodiment of the present disclosure.
Figure 7A:
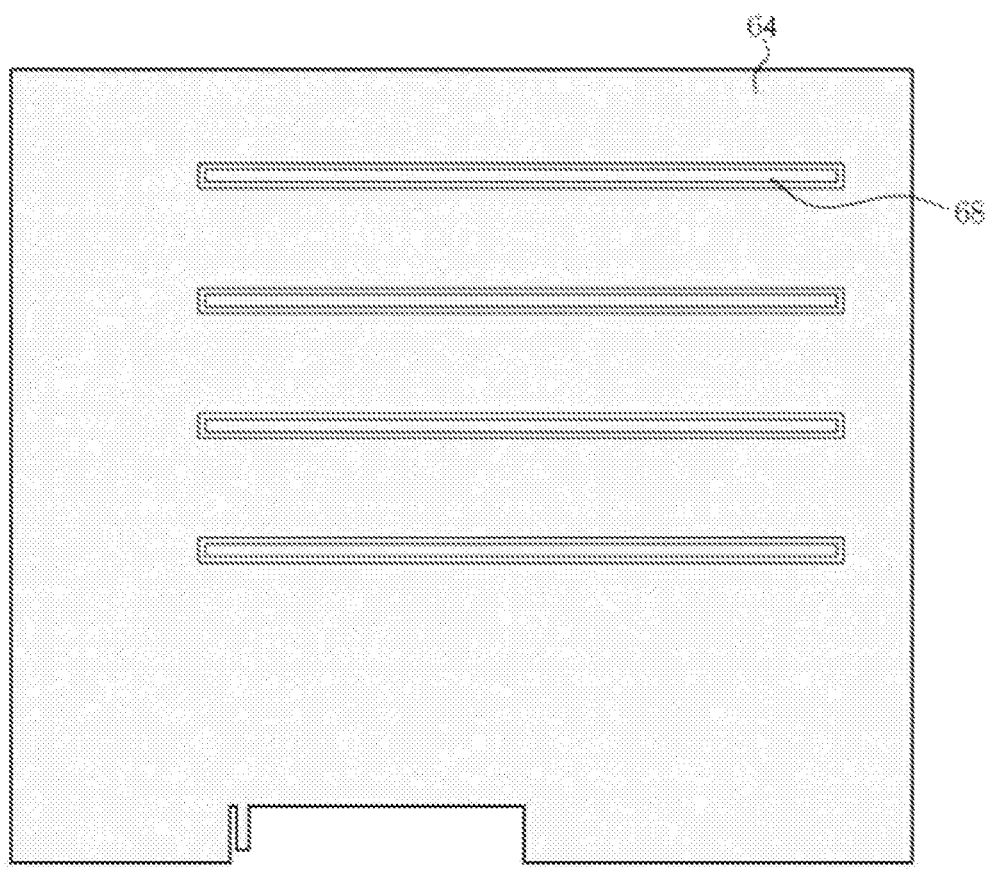
FIG. 7A is a top-viewed schematic diagram of bridging structures and shielding layer in the second embodiment of the resent disclosure.
Figure 7B:
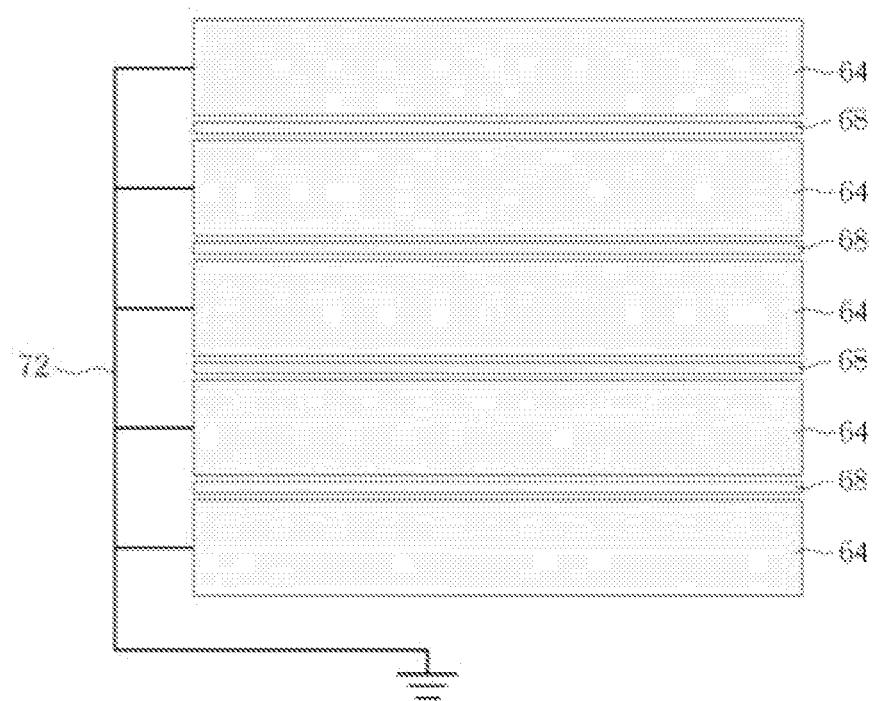
FIG. 7B is a top-viewed schematic diagram of the bridging structures and the shielding layers in accordance with another implementing model of the second embodiment of the present disclosure.

Referring to FIG. 6, FIG. 7A and FIG. 7B, second embodiment of the present disclosure is identical to the first embodiment. A touch panel 2 comprises substrate 10 on which a plurality of first conductive axes 20 and a plurality of second conductive units 32 are disposed. An insulating layer 50 covers the substrate 10, the first conductive axes 20, and the second conductive units 32, and partially exposes the second conductive units 32. Bridging structure 68 and shielding layer 64 can be formed simultaneously. Touch panel 2 further comprises a plurality of conductive lines 40 electrically connected to a partial set of first conductive axes 20 and to the second conductive units 32. When compared with the first embodiment of the present disclosure, in the first embodiment, bridging structure 68 is a strip-shaped structure connecting two adjacent second conductive units 32 simultaneously, whereas in the second embodiment, the bridging structure 68 is a strip-shaped structure connecting a plurality of second conductive units 32 simultaneously so as to form a plurality of second conductive axes 30. FIG. 7A illustrates a top-view diagram of bridging structure 68 and shielding layer 64. Bridging structure 68 is a strip-shaped structure, surrounded by shielding layer 64, one end of which is connected to the ground. In another embodiment shown in FIG. 7B, both the bridging structure 68 and the shielding layer 64 have a strip-shaped structure, which are mutually arranged in parallel. In FIG. 7B, the touch panel also includes an earthing line 72, of which one branched end is connected to the shielding layer and other end is connected to the ground so as to achieve static-electrical shielding. Compared with the first embodiment conductive axis of this embodiment is a strip-shaped structure and is relatively easy for being produced during manufacturing process, which further simplifies the manufacturing process. Materials of elements used in this embodiment are identical to those in the first embodiment, and therefore they are not described again.

Figure 8:
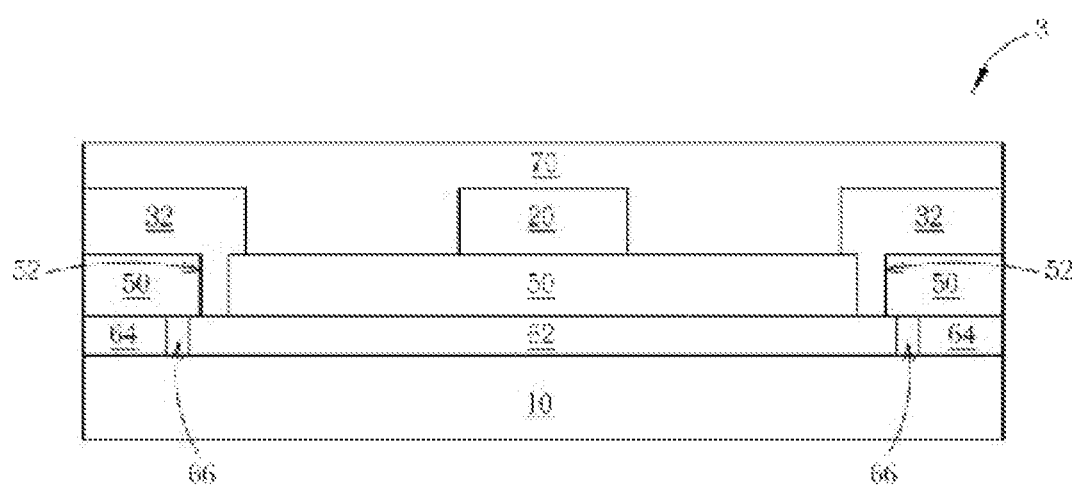
FIG. 8 is a cross-sectional schematic diagram of a touch panel in a third embodiment of the present disclosure.

With reference to FIG 8, difference between third embodiment and the first embodiment is to reverse the manufacturing procedure over the substrate 10. A touch panel 3 has a substrate 10 on which bridging structures 62 and shielding layer 64 are formed initially and are then separated by a gap 66 in-between. An insulating layer 50 covers the bridging structures 62 and the shielding layer 64 to expose at least partial bridging structures 62. Subsequently, a plurality of first conductive axes 20 and a plurality of second conductive units 32 are formed. It should be noted that second conductive units 32 are contacted with bridging strictures 62 via opening holes 52 on insulating layer 50. In other words, every two second conductive units 32 are electrically connected via a bridging stricture 62, while the various second conductive units 32 are conducted mutually and are connected in series to form the second conductive axes. Finally, a protective layer 70 covers the formed structure to finish manufacturing of the touch panel in the third embodiment. Similarly the third embodiment can be combined with the second embodiment to form bridging structure 62 in a strip-shaped structure for being electrically connected to a plurality of second conductive units 32. The touch panel can also be applied to multiple different products, which is equivalent to the description of the first preferable embodiment, and therefore includes use of the stricture of Touch On Lens.

In the foregoing embodiment of the present disclosure, material of the substrate 10 can be selected from transparent materials such as glass, PMMA, PVC, PP, PET, PEN, PC and PS, but is not limited thereto. Materials of first conductive axes 20, second conductive units 32, and conductive lines 40 can include various transparent conductive materials such as ITO, IZO, CTO, AZO, ITZO, zinc oxide, cadmium oxide, HfO, InGaZnO, InGaZnMgO, InGaMgO, InGaAlO, Graphene, Ag nanowire or CNT, but is not limited thereto.

It can be understood that the touch panel of the present disclosure is not limited to the structure or the method illustrated in the foregoing embodiment. As long as the mechanisms for manufacturing accord with that the first conductive axes and the second conductive axes are located on a same layer, while the bridging structures and the shielding layer are located on another layer, the material and the thickness of the bridging structures being identical to those of the shielding layer, or that the bridging structures and the shielding layer are manufactured simultaneously, they are belonging to the scope covered by the present disclosure.

While certain embodiments have been shown and described, various modifications and substitutions may be made thereto without departing from the spirit and scope of the present disclosure. Therefore, it is to be understood that the present disclosure has been described by way of illustration and not limitations.

What is claimed is:

1. A manufacturing method of a touch panel, including steps of:
    forming a plurality of bridging structures and a shielding layer on a substrate simultaneously;
    covering the bridging structures and the shielding layer with an insulating layer and exposing at least a partial set of bridging structures; and
    providing a plurality of first conductive axes and a plurality of second conductive units, wherein at least a partial set of second conductive units are electrically connected to the bridging structures, wherein the bridging structures have a strip-shaped structure, and wherein each said bridging structure is located under the insulating layer and is electrically connected to two adjacent second conductive units.

2. The manufacturing method of touch panel of claim 1, wherein the method further comprises the step of forming a plurality of conductive lines electrically connected to the first conductive axes and the second conductive units.

3. The manufacturing method of touch panel of claim 2, wherein the conductive lines are made from transparent conductive materials or metals selected from a group comprising of Aluminium, Copper and Silver.

4. The manufacturing method of touch panel of claim 1, wherein the method further comprises the step of covering the first conductive axes and the second conductive units with a protective layer.

5. The manufacturing method of touch panel of claim 1, wherein the shielding layer surrounds the bridging structures.

6. The manufacturing method of touch panel of claim 1, wherein the shielding layer has a strip-shaped structure and is arranged in parallel with the bridging structures.

7. The manufacturing method of touch panel of claim 1, wherein the bridging structures are electrically separated from the shielding layer.

8. A touch panel, comprising:
    a plurality of first conductive axes and a plurality of second conductive units;
    an insulating layer covering the first conductive axes and the second conductive units and exposing at least a partial set of second conductive units; and
    a plurality of bridging structures and a shielding layer on the insulating layer:
    wherein the bridging strictures are electrically connected to the partial set of second conductive units, arid wherein the shielding layer and the bridging stricture are formed during a same manufacturing process and in same materials, wherein the shielding layer and the bridging structures are located on a same layer and have same thicknesses.

9. The touch panel of claim 8, where the touch panel further includes a substrate, and wherein the first conductive axes and the second conductive units are formed on the substrate.

10. The touch panel of claim 8, wherein the touch panel further comprises a plurality of conductive lines electrically connected to the first conductive axes and the second conductive units.

11. The touch panel of claim 8, wherein the touch panel further comprises a protective layer covering the bridging structures and the shielding layer.

12. The touch panel of claim 8, wherein material of the shielding layer and the bridging structures comprises of one or more of transparent conductive materials.

13. The touch panel of claim 12, wherein the transparent conductive materials are selected from a group comprising of ITO, IZO CTO, AZO, ITZO, zinc oxide, cadmium oxide, HfO, InGaZnO, InGaZnMgO, InGaMgO, InGaAlO, Graphene, Ag nanowire, and CNT.

14. The touch panel of claim 8, wherein the shielding layer surrounds the bridging structures.

15. The touch panel of claim 8, wherein the shielding layer and the bridging structures are arranged mutually parallel to each other.

16. A manufacturing method of a touch panel, including steps of:
    forming a plurality of bridging structures and a shielding layer on a substrate simultaneously;
    covering the bridging structures and the shielding layer with an insulating layer and exposing at least a partial set of bridging structures; and
    providing a plurality of first conductive axes and a plurality of second conductive units, wherein at least a partial set of second conductive units are electrically connected to the bridging structures, wherein the e bridging strictures have a strip-shaped structure, and wherein each said bridging structure is located underneath the insulating layer and is electrically connected to the plurality of second conductive units simultaneously.

17. The manufacturing method of a touch panel of claim 16, wherein the shielding layer has a strip-shaped structure and is arranged in parallel with the bridging structures.

18. The manufacturing method of touch panel of claim 17, further comprising a step of forming a plurality of conductive lines electrically connected to the first conductive axes and the second conductive units.

19. The manufacturing method of touch panel of claim 17, further comprising a step of forming a protective layer covering the first conductive axes and the second conductive units.

20. The manufacturing method of touch panel of claim 17, wherein the shielding layer surrounds the bridging structures.

* * * * *